(12) United States Patent
Abou-Chahine et al.

(10) Patent No.: US 12,291,167 B2
(45) Date of Patent: May 6, 2025

(54) METHOD FOR TRIGGERING A FIRST DEVICE AS STEP FOR ACCESSING AN ACCESSIBLE DEVICE

(71) Applicant: HELLA GmbH & Co. KGaA, Lippstadt (DE)

(72) Inventors: Zeid Abou-Chahine, Lippstadt (DE); Henning Irle, Lippstadt (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 32 days.

(21) Appl. No.: 18/116,705

(22) Filed: Mar. 2, 2023

(65) Prior Publication Data
US 2023/0202429 A1    Jun. 29, 2023

Related U.S. Application Data

(63) Continuation of application No. PCT/EP2021/058945, filed on Apr. 6, 2021.

(30) Foreign Application Priority Data

Sep. 3, 2020  (DE) .................... 10 2020 123 016.8

(51) Int. Cl.
*B60R 25/24*    (2013.01)
*B60R 25/01*    (2013.01)

(52) U.S. Cl.
CPC .............. *B60R 25/24* (2013.01); *B60R 25/01* (2013.01); *B60R 2325/101* (2013.01)

(58) Field of Classification Search
CPC ... B60R 25/24; B60R 25/01; B60R 2325/101; G07C 9/00944; G07C 2009/00555; G07C 9/00309
See application file for complete search history.

(56) References Cited

U.S. PATENT DOCUMENTS 11,051,124 B2    6/2021  Eggert
2015/0310680 A1*  10/2015  Lablans .............. H04J 13/0029
                                              340/5.61
2018/0186334 A1*   7/2018  Munafo .................. B60R 25/24

FOREIGN PATENT DOCUMENTS

DE    102017011879 A1    6/2019
WO    WO2009144868 A1    12/2009
WO    WO-2019092051 A1 *  5/2019

OTHER PUBLICATIONS

International Search Report dated Jul. 6, 2021 in corresponding application PCT/EP2021/058945.

* cited by examiner

*Primary Examiner* — James J Yang
(74) *Attorney, Agent, or Firm* — Muncy, Geissler, Olds & Lowe, P.C.

(57) ABSTRACT

A method for triggering a first device, the first device having at least one antenna for wireless communication with a second device having at least one antenna, the first device being an access device, for example, a key fob or smart device, or an accessible device, for example a vehicle, the second device being the other one of the accessible device and the access device, and the triggering of the first device being a step required for accessing the accessible device.

12 Claims, 11 Drawing Sheets

METHOD FOR TRIGGERING A FIRST DEVICE AS STEP FOR ACCESSING AN ACCESSIBLE DEVICE

This nonprovisional application is a continuation of International Application No PCT/EP2021/058945, which was filed on Apr. 6, 2021, and which claims priority to German Patent Application No 10 2020 123 016.8, which was filed in Germany on Sep. 3, 2020, and which are both herein incorporated by reference.

BACKGROUND OF THE INVENTION

Field of the Invention

The invention relates to a method for triggering a first device, wherein the triggering of the first device is a step required for accessing an accessible device. The invention further relates to a method for accessing an accessible device including the method for triggering the first device, a first device, a system having the first device and a second device, a computer program product and a computer-readable medium.

Description of the Background Art

Different applications are known, where an accessible device is to be accessed without a physical key and only by means of an access device having wireless communication capabilities in order to communicate with the accessible device.

Particular relevant applications are access systems of vehicles. Such access systems are also known as keyless systems. The physical key is substituted by some sort of electronic access device, e.g. a chip having wireless communication capabilities implemented in a key fob, and the vehicle may be accessed by means of that electronic access device. Usually, this requires the vehicle owner to actively engage in accessing the vehicle, e.g. by means of pushing a physical button on the electronic access device.

However, nowadays, new vehicles are often equipped with passive keyless systems. The vehicle may be accessed, e.g., its doors and/or trunk opened, or the ignition started, merely by means of a short-distance wireless communication of the vehicle with the electronic access device.

Figure 1:
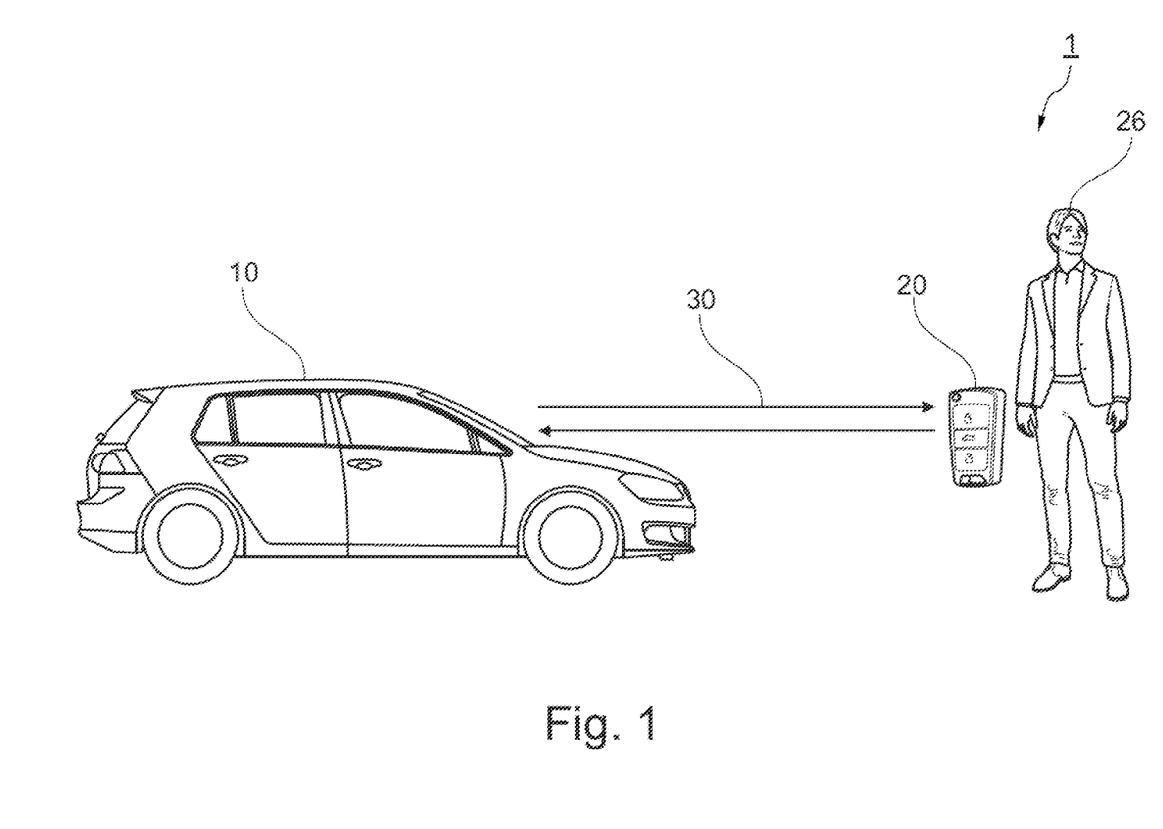
FIG. 1 is a schematic representation of keyless system according to the invention.

FIG. 1 schematically shows a keyless system 1, which has the passive keyless implementation, meaning that the vehicle 10 may be accessed without any vehicle owner 26 interaction with the access device 20 but merely by being in close proximity to the vehicle, e.g., 1 meter.

In the example of FIG. 1, the access device 20 is provided as a key fob 20. It sets up a communication link with the vehicle 10. More precisely, the antenna (not shown in FIG. 1) of the key fob 20 is communicating via the communication link with a thereto compatible antenna (not shown in FIG. 1) of the vehicle 10.

Figure 2:
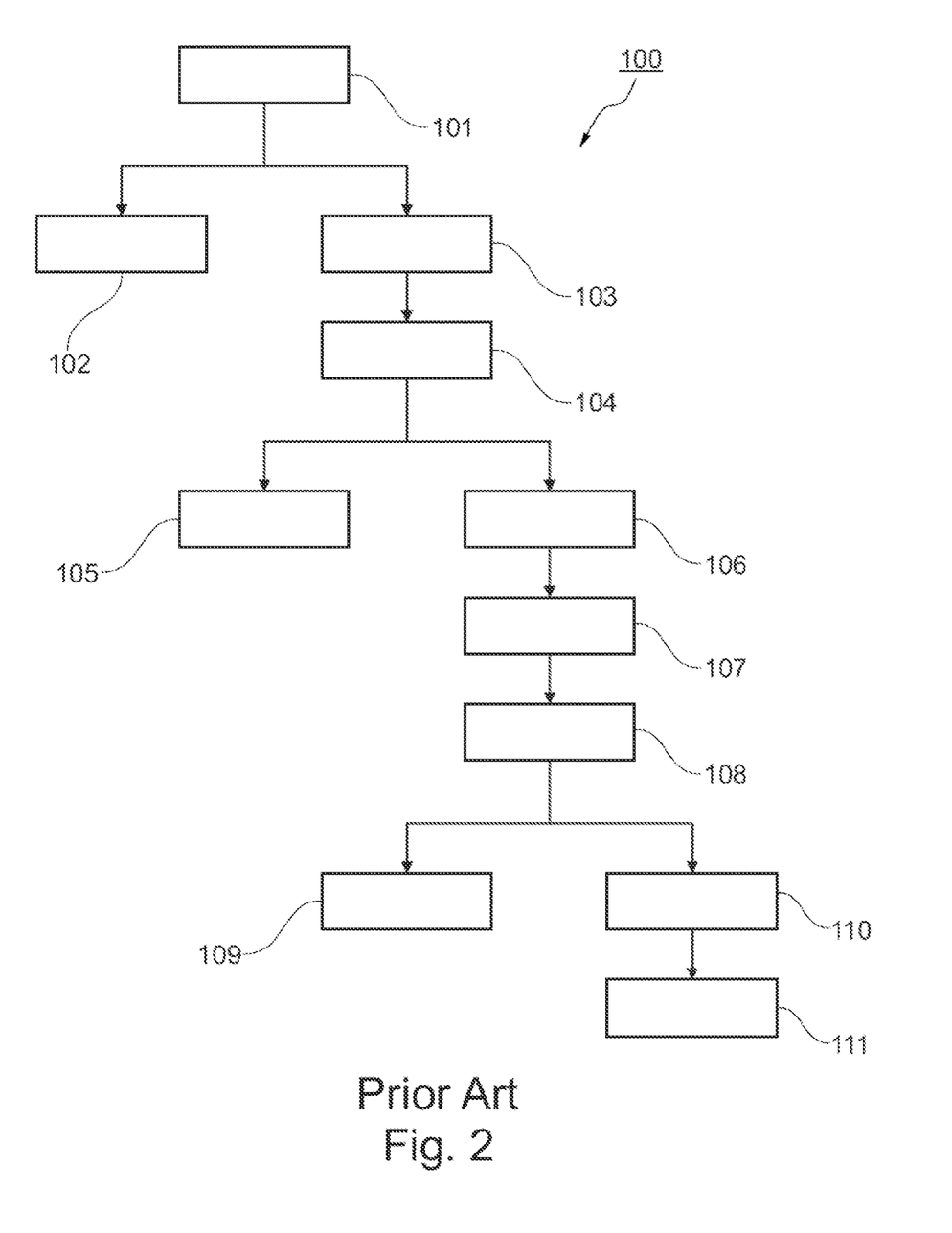
FIG. 2 is a schematic representation of a prior art method of the keyless system of FIG. 1.

FIG. 2 schematically shows the prior art method 100 of how the keyless system 1 of FIG. 1 functions in order to grant access to the vehicle 10 only to the rightful vehicle owner 26 or person having the original physical electronic access device 20 in his possession.

In step 101 of the prior art method 100, the antenna of the vehicle 10 sends out a so-called wake-up or challenge signal. For the wake-up or challenge signal to be sent out it may be required to touch a handle of the vehicle 10 or perform other interactions with the vehicle 10.

That wake-up or challenge signal has a rather limited range, e.g., 10 meters. The limited range of the wake-up or challenge signal or, in other words, communication link which may be established between the vehicle 10 and the key fob 20 is preselected such that the vehicle 10 is only accessed, e.g., unlocks, when the vehicle owner 26 is in such a close proximity to the vehicle 10 that it is safe to predict that he will want to access the vehicle 10.

If the key fob 20 is not within the preselected range of the wake-up or challenge signal, the key fob 20 cannot respond to the wake-up or challenge signal sent out by the vehicle 10 and the method is aborted in step 102. However, the vehicle 10 may periodically repeat the step 101, i.e., send out wake-up or challenge signals, e.g., every few milliseconds, if an interaction with the vehicle 10 is not required.

Once the key fob 20 is within a proximity to the vehicle 10 matching the selected range of the wake-up or challenge signal, the key fob 20 receives the wake-up or challenge signal in step 103. The wake-up or challenge signal contains a unique message or key known or identifiable only to or by the key fob 20. In step 104, the key fob 20 determines whether the message contained in the received wake-up or challenge signal matches a saved or expected message. With respect to the content of the message, its identification and the particular security features, such as encryption, appliable to the content of the wake-up or challenge signal there are different methods known in the prior art.

If that is not the case, the method 100 aborts in step 105. For example, a wake-up or challenge signal from a different vehicle, which is not the one of the owner 26, may have been received and that wake-up or challenge signal has a different message.

If, on the other hand, the message contained in the received wake-up or challenge signal matches the expected message, in step 106 a wake-up or challenge signal from the key fob 20 is sent back to the vehicle 10. That wake-up or challenge signal contains a unique message or key known or identifiable only to or by the vehicle 10.

The vehicle 10 receives the wake-up or challenge signal sent from the key fob 20 in step 107 and determines in step 108 whether the message contained therein matches an expected message expected by the vehicle 10. If this is not the case, e.g., a wake-up or challenge signal from a key fob not being the one of the owner 26, has been received, the vehicle 10 does not grant access and the method 100 aborts in step 109. Otherwise, if the message contained in the received wake-up or challenge signal and the expected message match, the vehicle 10 is triggered in step 110 and consequently the vehicle 10 is accessed in step 111, e.g., the vehicle 10 is unlocked.

Although accessing the vehicle 10 by means of a keyless system 1 as described above offers an advantageous comfort function to the owner 26, it also has the problem of being susceptible to hacking attacks. In particular, the so-called relay attack or relay station attack (also referred to as RSA) are being used to gain access to the vehicle 10.

Figure 3:
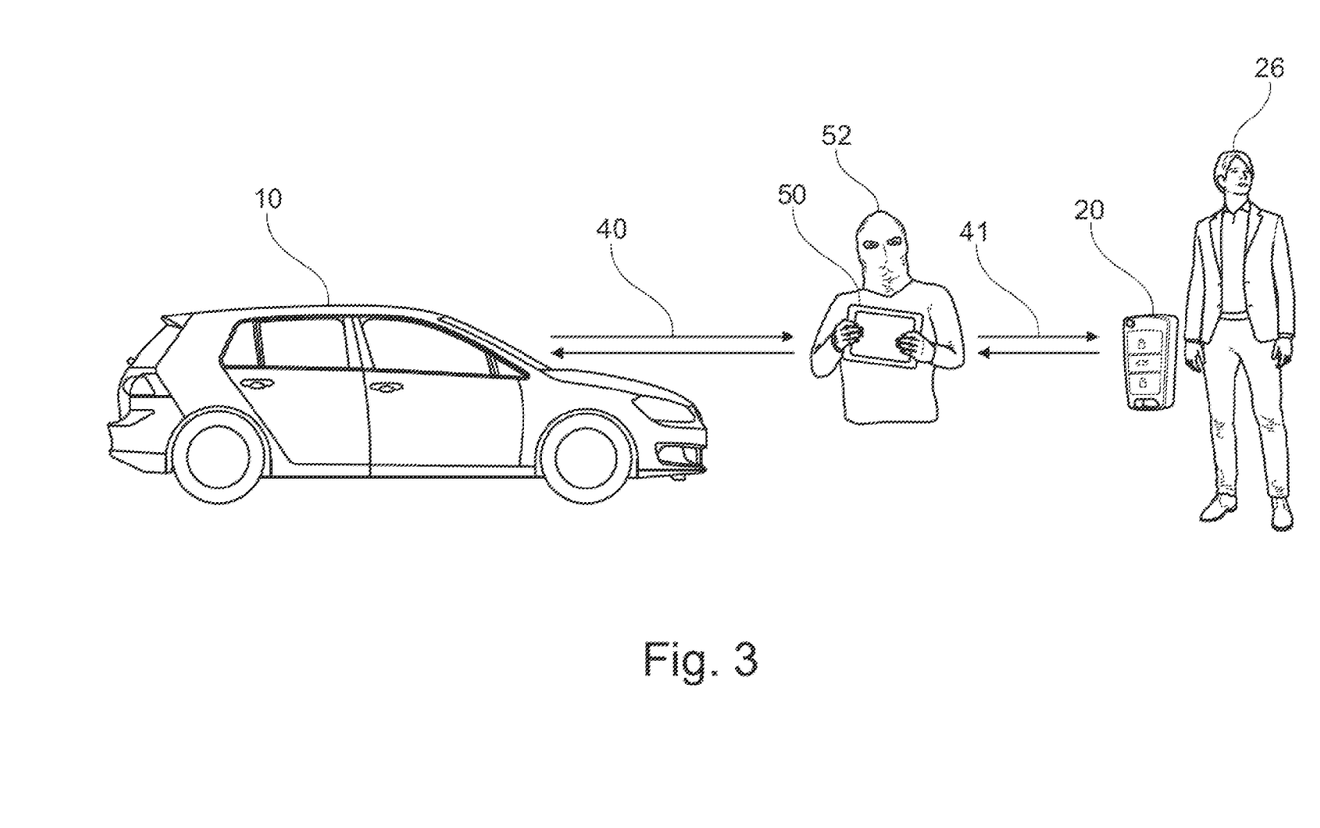
FIG. 3 is a schematic representation of a relay attack with one relay station in the keyless system of FIG. 1.

FIG. 3 shows an exemplary setup of such a relay attack. An attacker 52 positions a relay station 50 in between the vehicle 10 and the key fob 20. The attacker 52 receives the wake-up or challenge signal on his relay station 50 at a distance within the preselected range of the wake-up or challenge signal via a first relay communication link 40. If necessary, the attacker 52 may trigger the vehicle 10 to send out the wake-up or challenge signal, e.g., touch the handle of the door on the side of the driver of the vehicle 10.

The relay station 50 then forwards (or relays) the wake-up or challenge signal to the key fob 20 with the original message contained therein via a second relay communication link 41. As described above, the key fob 20 will match that message to the expected message and send back a response signal. This is then received by the relay station 50 via the second relay communication link 41 and forwarded (or relayed) with its original message to the vehicle 10 via the first relay communication link 40. Thereby, the response signal from the key fob 20 is directly received by the vehicle. Consequently, the maximum range of the attack may be limited.

Figure 4:
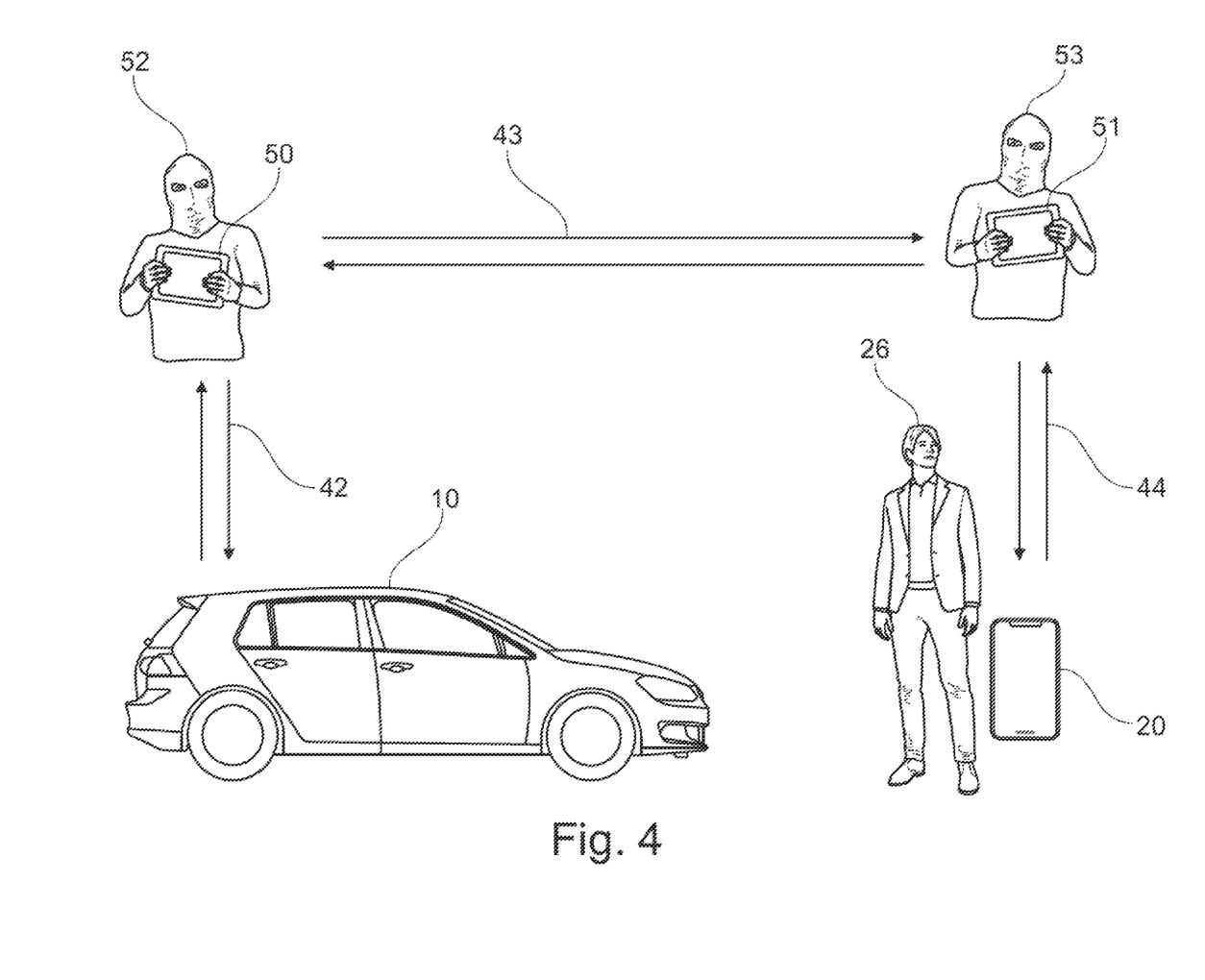
FIG. 4 is a schematic representation of a relay attack with two relay stations in the keyless system of FIG. 1.

FIG. 4 shows a further exemplary setup of such a relay attack making use of two relay stations 50, 51. A first attacker 52 with the first relay station 50 is located near the vehicle 10 and a second attacker 53 with a second relay station 51 is located in the immediate vicinity of the key fob owner 26. In FIG. 4, the scale of elements in FIG. 3 is not accurate but rather schematic. The key fob owner 26 is at a much larger distance from the vehicle 10 than in FIG. 3.

Similar to the exemplary setup of FIG. 3, the wake-up or challenge signals are forwarded (relayed) in between the vehicle 10 and the access device 20, in this case taking the form of a smart device 20, such as a smartphone 20 by means of multiple relay communication links 42, 43, 44 in between these and the relay stations 50, 51. Therein, the relay communication link 43 is designed to bridge a large distance between the relay stations 50, 51.

Such attack setup is designed for electronically reducing a large physical distance, which may be multiples of the preselected range of the wake-up or challenge signals, between the owner 26 and the vehicle 10 using relay station technology. Thereby, the keyless system 1 may be tricked into thinking that the vehicle 10 and the access device 20 are in close proximity to each other although they are not. The attackers may gain access to the vehicle 10 despite the limited range of the antennas of the vehicle 10 and the access device 20 and the encrypted contents of the wake-up or challenge signal.

SUMMARY OF THE INVENTION

It is therefore an object of the present invention to provide a method making such a keyless system safer, in particular preventing or at least making more difficult attacks like a relay station attack.

In an exemplary embodiment, the object is solved by a method for triggering a first device, a method for accessing an accessible device, a first device, a system, a computer program product, and a computer-readable medium. The features and details described in connection with the method for triggering a first device of the invention apply in connection with the method for accessing an accessible device, the first device, the system, the computer program product and the computer-readable medium as well as the other way around, so that regarding the disclosure of the individual aspects of the invention, it is or can be referred to one another.

According to a first aspect of the invention, the above objective is solved by a method, in particular a computer-implemented method, for triggering a first device. The first device has at least one antenna for wireless communication with a second device having at least one antenna. The first device is an accessible device, in particular a vehicle, or an access device, in particular a key fob or smart device. The second device is the other one of the accessible devices and the access device. The triggering of the first device is a step required for accessing the accessible device. The method comprises the steps of: receiving at least one pilot signal on the first device via the at least one antenna, determining whether at least one message contained in the received at least one pilot signal corresponds to at least one expected message being expected by the first device, extracting channel state information from the received at least one pilot signal, deriving at least one channel feature from the extracted channel state information, determining whether at least one derived channel feature corresponds to at least one channel feature expected by the first device, and triggering the first device, if the received at least one message corresponds to the expected at least one message and the at least one derived channel feature corresponds to the at least one expected channel feature, or, otherwise, not triggering the first device.

The case of otherwise applies when the received message does not correspond to the expected message or the at least one derived channel feature does not correspond to the at least one expected channel feature.

Current methods for solving the relay station attack problem focus on proximity, in particular ranging or localization. For example, it may be identified how far the access device is away from the accessible device or where exactly relative to the vehicle the access device is located. This information may help in solving the problem.

The invention, however, does not focus on proximity, although such technique may be implemented additionally, but aims at identifying traces or evidence from an attack, in particular a relay attack, in the received at least one pilot signal or, in other words, its wireless communication channel, through which it was sent. For this purpose, the channel state information of the received at least one pilot signal is extracted and a at least one channel feature is derived therefrom. The at least one channel feature may be derived by computation or simply extracting it from the channel state information, for example. Then it is determined whether this at least one derived channel feature is actually one which is expected or, in other words, if there are traces or evidence from an attack in the at least one derived channel feature, which have actually changed that at least one channel feature over the expected at least one channel feature such that it can be established that this at least one channel feature does not originate in a communication between the access device and the accessible device that has not been interfered with by a relay station.

Also, a further determination of whether the at least one message contained in the at least one received pilot signal being expected by the first device is performed. In other words, it is additionally to the signal tracing by means of the extracted channel state information determined, whether the at least one message comes from the accessible device, e.g., the vehicle, or the access device, e.g., the key fob or smart device. This at least one message may be encrypted or secured by any method known in the art. In particular, the accessible device and the access device may be configured with such encryption or security features and/or methods as known in the state of the art.

If the determinations result in a case that the received at least one message corresponds to the expected at least one message and the at least one derived channel feature corresponds to the at least one expected channel feature, the first device is triggered. In other words, if it is identified by means of the at least one message and the at least one derived channel feature that the at least one message originates from the second device than the first device is triggered. Thereby, the security of the method for triggering the first device in a method for accessing the accessible device is substantially increased over only having an encrypted message in the pilot signal and/or proximity detecting techniques.

Otherwise, i.e., if the received at least one message does not correspond to the expected at least one message or the at least one derived channel feature does not correspond to the at least one expected channel feature, the first device is not triggered. This corresponds to a case where the at least one pilot signal was not directly sent from the second device.

In the method for triggering a first device, the first device may be the access device or the accessible device, whereas the second device is other one. When the first device is the accessible device, all the method steps of the method according to the first aspect of the invention may be carried out on the accessible device. In this case, the triggering of the first device may directly result in accessing the accessible device or, in other words, granting access to the accessible device. For example, the locks of a vehicle as accessible device may be unlocked after the vehicle is triggered.

Typically, in the above case of the first device being the accessible device, a prior at least one pilot signal may have been sent from the accessible device to the second device as access device. Only after the access device recognizes the at least one message contained therein as the at least one expected message, the access device will actually send back the at least one pilot signal, which is then received by the accessible device as first device. In turn, the accessible device as first device carries out the method steps (a) through (f) of the method of the first aspect of the invention as explained above.

However, alternatively, it is possible that the first device is the access device. Then, all the method steps of the method of the first aspect of the invention may be carried out on the access device. In this case, the triggering of the first device may not directly result in accessing the accessible device or, in other words, granting access to the accessible device. Instead, the triggering of the first device may result in sending at least one pilot signal back to the accessible device being the second device. If the access device as first device is not triggered, no pilot signal is sent back to the accessible device as the second device and the accessible device cannot be accessed. Therefore, the triggering of the access device as first device is only an intermediate step required for accessing the accessible device but not the final step as may be when the accessible device is the first step.

Additionally, it is possible that the method for triggering a first device is performed consecutively. Firstly, the first device may be the access device and secondly, the first device may be the accessible device. Thereby, the security of the method for accessing the accessible device may even further be increased. However, this also requires that both the access device and the accessible device are provided with capabilities for extracting the channel state information, deriving at least one channel feature therefrom and determining whether it is expected.

As should have become clear from the above, the invention is not limited to the first device being a specific one of the access device and the accessible device but rather the wording first device and second device are provided for distinguishing between a device on which the method steps of the method for triggering the first device may be executed, i.e., the first device, and the second device, which is supposed to send the at least one pilot signal received by the at least one antenna of the first device. However, in case that there is a relay attack, the actual at least one pilot signal may have been sent or forwarded by a relay station as previously explained.

The channel state information includes channel features or, in other words, channel properties of a communication link or, in other words, communication channel of a communication link. The channel properties or features are characteristic for the communication channel via which the pilot signal is being transmitted or sent. The extraction, in particular estimation, of such channel state information may be performed based on a signal received over the communication channel. The channel state information describes how a signal propagates from a transmitter to a receiver. It may represent the combined effect of, for example, scattering, fading, and power decay with distance. The channel state information may be extracted or estimated at the receiver being the first device in the method according to the first aspect, whereas the second device functions as a transmitter in the method according to the first aspect. The extraction of channel state information may be done in frequency domain or time domain.

The at least one derived channel feature and/or the at least one expected channel feature may be modified by means of an analytical and/or statistical process. Additionally, or alternatively, this may mean that the modification is performed live on the first device. Thereby, the security may be increased even further by a method improving itself with time.

Machine learning, in particular deep learning, may be applied in the analytical and/or statistical process. For example, the machine learning may use the at least one derived channel feature and/or the at least one expected channel feature as input features and based on their specific values or their choice among several different channel features improve the process. The output of such machine learning may be that the specific values of the at least one expected channel feature is amended or different ones of the several different channel features derivable from the extracted channel state information may be used.

The first device may have two or more antennas. Additionally, or alternatively, the second device may have two or more antennas. Where the first device has two antennas and the second device has one antenna, such setup is commonly referred to as a single input multiple output (SIMO) compared to a single input single output (SISO) setup, both of which may be implemented in the invention. Where the second device has two antennas and the first device has one antenna, such setup is commonly referred to as a multiple input single output (MISO). A MISO setup may also be implemented in the invention. Thereby, the method may be performed based on two or more received pilot signals. For example, when the first device has two antennas, these act as receivers and receive two pilot signals from the second device acting as transmitter. The channel state information extracted from two pilot signals is larger and allows for more channel features to be derived and compared. This can effectively increase the security.

In particular, the first device may have two or more antennas and the second device may have two or more antennas such that the method is performed based on at least four received pilot signals. Where the first device has two antennas and the second device has two antennas, such setup is commonly referred to as a multiple input multiple output (MIMO), which is a particular preferable implementation in the invention. It enables even greater extracting of channel state information.

The channel state information may be extracted as a channel matrix from the at least four received pilot signals.

Such channel matrix may contain values describing the entirety of the channel features of each one of the pilot signals.

The derived channel feature may be a determinant computed from the extracted channel matrix. The determinant of the channel matrix has been found to be a particular suitable channel feature to be derived and compared against an expected determinant as expected channel feature.

The expected channel feature may be any value of a determinant but substantially zero. Substantially zero includes zero and values near zero due to additional noise. This means that when the determinant of the computed determinant is substantially zero, the first device is not triggered. Otherwise, when the computed determinant is any number other than substantially zero, and the received at least one message is the at least one expected message, the first device is triggered. A specific example based on a MIMO setup is explained below with reference to FIGS. 5 to 10.

Alternatively, it is possible that the at least one derived channel feature is from an adjacent channel noise, a fading characteristic and/or any channel feature specific to multiple pilot signals, e.g., two, four or more pilot signals. In this case, instead of taking combined values describing the entirety of the channel features as in the case of the channel matrix, separate ones or multiples of such channel features, in particular their values, are derived and consecutively compared to expected channel features, in particular expected values of such.

According to a second aspect of the invention, the initially stated objective is solved by a method, in particular a computer-implemented method, for accessing an accessible device, in particular a vehicle. The method comprises the method according to the first aspect of the invention, in particular its method steps. The method according to the second aspect of the invention further comprises the steps of: accessing the accessible device after triggering the first device, if the accessible device is the first device, or sending at least one further pilot signal to the second device via the at least one antenna of the first device after triggering the first device, if the access device is the first device.

The method according to the second aspect of the invention is a method for accessing the accessible device including the method for triggering the first device according to the first aspect of the invention. As previously explained, when the first device is the accessible device, the accessible device may be directly accessed after it is triggered. However, if the first device is the access device, a further pilot signal is being sent to the accessible device as second device after triggering the access device.

The accessible device as second device may consecutively become the first device again in the sense of the method according to the first aspect of the invention or, in other words, the method according to the first aspect of the invention may consecutively, i.e., after performing it on the access device as first device, be performed on the accessible device as first device.

Accordingly, in the case that at least one further pilot signal is being send to the accessible device as the second device, the method according to the second aspect of the invention may further comprise the steps of: receiving at least one further pilot signal on the second device via the at least one antenna, determining whether at least one message contained in the received at least one further pilot signal corresponds to at least one expected message being expected by the second device, extract channel state information from the received at least one further pilot signal, deriving at least one channel feature from the extracted channel state information, determining whether at least one derived channel feature corresponds to at least one channel feature expected by the second device, and accessing the accessible device, if the received at least one message corresponds to the expected at least one message and the at least one derived channel feature corresponds to the at least one expected channel feature, or, otherwise, not accessing the accessible device.

Therein, the features explained before with respect to the method of the first aspect of the invention, in particular with respect to the channel state information and the channel features, may be implemented as well.

The accessible device may be a vehicle, in particular a car. The accessing may be an unlocking of the vehicle, in particular a passive unlocking of the vehicle Alternatively, or additionally, the accessing may be a starting of an ignition of the vehicle.

According to a third aspect of the invention, the initially stated objective is solved by a first device having at least one antenna for wireless communication with a second device having at least one antenna. The first device is an access device, in particular a key fob or smart device, or an accessible device, in particular a vehicle. The first device comprises means configured to execute the method according to the first aspect of the invention or the second aspect of the invention.

The means of the first device may, besides the at least one antenna, be a controller unit, in particular of the at least one antenna, a memory unit, a computing unit and an accessible unit.

According to a fourth aspect of the invention, the initially stated objective is solved by a system having the first device according to the third aspect of the invention and the second device.

The second device may similarly to the first device comprise a component configured to execute the method according to the first aspect of the invention or the second aspect of the invention. Such component may, besides the at least one antenna, be a controller unit, in particular of the at least one antenna, a memory unit and a computing unit.

According to a fifth aspect of the invention, the initially stated objective is solved by a computer program product comprising instructions to cause the first device of the third aspect of the invention or the system of the fourth aspect of the invention to execute the method according to the first aspect of the invention or the second aspect of the invention.

According to a sixth aspect of the invention, the initially stated objective is solved by a computer-readable medium having stored thereon the computer program product according to the fifth aspect of the invention.

The computer-readable medium may be the memory unit of the first device or the second device or any other unit able to store the computer program product such that it may be read by a computer.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

FIGS. 1 to 4 are discussed in depth in the introductory portion of this patent application.

Figure 5:
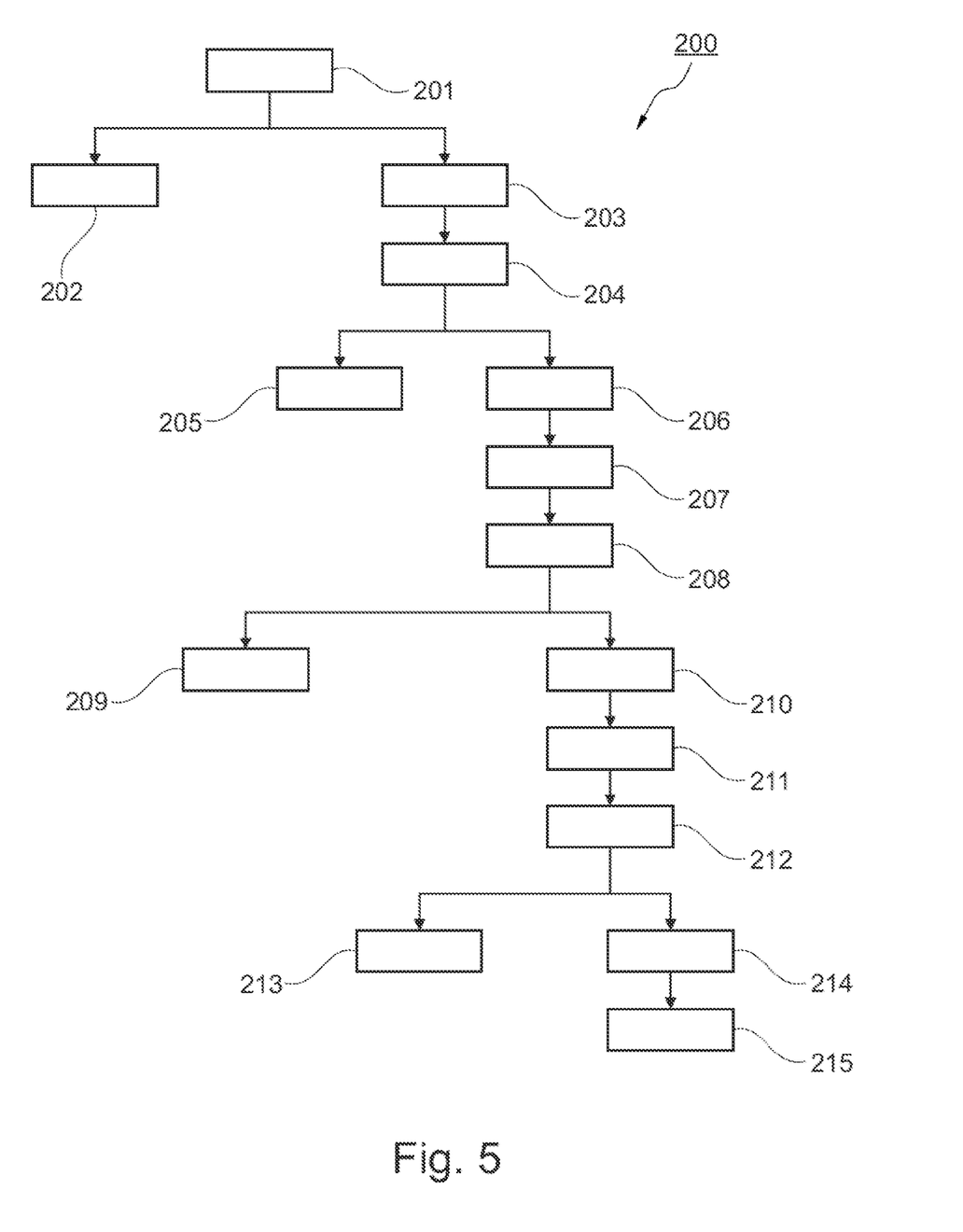
FIG. 5 is a schematic representation of an exemplary method of the invention for the keyless system of FIG. 1.

FIG. 5 schematically shows a method 200 of how the keyless system 1 of FIG. 1 functions according to an example of the invention in order to grant access to the accessible device 10 only to the rightful owner 26 or person having the original physical electronic access device 20 in his possession. The method 200 of the example of the invention is similar to the prior art method in the first steps 201 to 208.

The accessible device 10 in the further discussed examples of the invention is a vehicle 10, in particular a car 10. However, the accessible device 10 is not limited to a vehicle 10 but may be of any other type, e.g., a car garage, a door of a building, or similar. The access device 20 may be a key fob 20 or a smart device 20 like a smartphone 20, for example. However, the access device 20 is not limited to these examples but may alternatively be also of any other type, for example a key card, smart card, smart watch, or similar.

In step 201 of the method 200, at least one antenna of the accessible device 10 sends out a pilot signal. For the at least one pilot signal to be sent out it may be required to touch a handle of the vehicle 10 or perform other interactions with the vehicle 10.

That pilot signal may have a rather short range, e.g., 5 to 100 meters, in particular 10 to 50 meters. The short range of the at least one pilot signal or, in other words, communication link established between the vehicle 10 and the key fob 20 is preselected such that the vehicle 10 is only accessed, e.g., unlocks, when the vehicle owner 26 is in such a close proximity to the vehicle 10 that it is safe to predict that he will want to access the vehicle 10.

If the key fob 20 is not within the preselected range of the pilot signal, the key fob 20 cannot respond to the pilot signal sent out by the vehicle 10 and the method 200 is aborted in step 202. However, it may be provided that the vehicle 10 periodically repeats the step 201, i.e., send out pilot signals every few milliseconds, for example, if an interaction with the vehicle 10 is not required.

Once the key fob 20 is within a proximity to the vehicle 10 matching the selected range of the pilot signal, the key fob 20 receives the at least one pilot signal in step 203. The pilot signal contains a unique message or key known or identifiable only to or by the key fob 20. In step 204, the key fob 20 determines whether the message contained in the received pilot signal matches a saved or expected message. With respect to the content of the message, its identification and the particular security features, such as encryption, appliable to the content of the pilot signal there are different methods known in the prior art which may be applied.

If that is not the case, the method 200 aborts in step 205. For example, a pilot signal from a different vehicle, which is not the one of the owner 26, may have been received and that pilot signal has a different message.

If, on the other hand, the message contained in the at least one received pilot signal matches the expected message, in step 206 a pilot signal from the key fob 20 is sent back to the vehicle 10. That pilot signal contains a unique message or key known or identifiable only to or by the vehicle 10.

The vehicle 10 receives the pilot signal sent from the key fob 20 in step 207 and determines in step 208 whether the message contained therein matches an expected message expected by the vehicle 10. If this is not the case, e.g., a pilot signal from a key fob not being the one of the owner 26, has been received, the vehicle 10 does not grant access and the method 200 aborts in step 209. Otherwise, if the message contained in the received pilot signal and the expected message match, the vehicle 10 is not triggered in step 210 to grant access to the vehicle but the vehicle 10, in particular a specific component or unit in the vehicle such as a computing unit, extracts channel state information from the received at least one pilot signal.

In the consecutive step 211, at least one channel feature from the extracted channel state information is derived. In step 212, the at least one derived channel feature is compared to at least one channel feature expected by the vehicle 10. If the at least one derived channel feature, e.g., in its value, corresponds to the at least one expected channel, e.g., lies within its expected value range, the method 200 proceeds with step 214. Otherwise, the method 200 aborts in step 213.

In step 214, the vehicle 10 is triggered to grant access to the vehicle 10 in step 215, which is performed after the triggering of the vehicle 10. For example, in step 215, the locks of the vehicle 10 may be unlocked or its ignition may be started.

The method 200 may use the security feature of steps 210 to 212 in the access device 20 before sending the at least one pilot signal out in step 206 in addition to or as alternative to steps 210 to 212 in the accessible device 10.

In the method 200 according to this example of the invention, the digital processing of the at least one pilot signal by means of extracting the channel state information, deriving the at least one channel feature and comparing it to an expected at least one channel feature is a security feature designed to tackle a relay attack. An example of this and of the particular channel feature, which may be used, is given with reference to FIGS. 8, 9 and 10.

In this example, the accessible device 10 and the access device 20 may have a structure or components as explained with reference to FIGS. 6 and 7.

Figure 6:
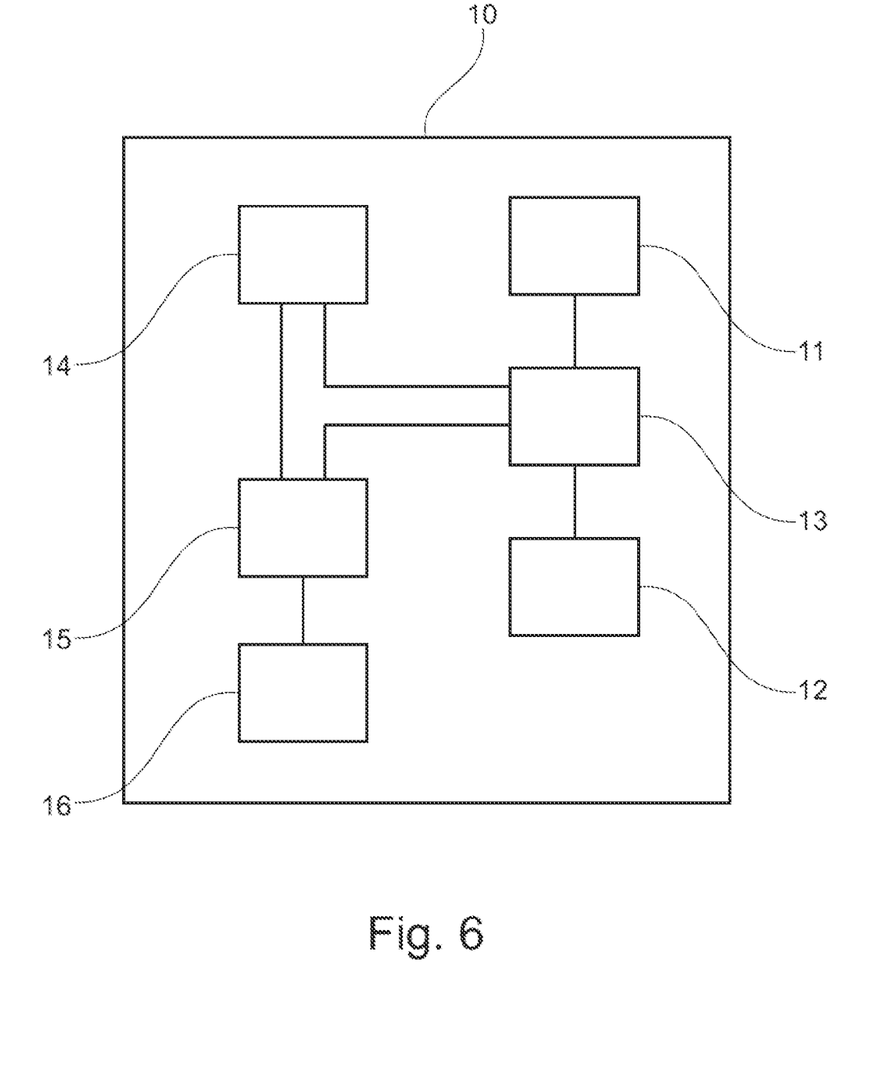
FIG. 6 is a schematic representation of an example of the accessible device in the keyless system of FIG. 1.

FIG. 6 shows an example of a possible structure of the accessible device 10 having two antennas 11, 12 and a controller unit 13 connected to them. The controller unit 13 controls the pilot signals to be send out from and received by the antennas 11, 12. The controller unit 23 is connected to a memory unit 14 and a computing unit 15. The computing unit 15 is connected to an accessible unit 16, which may be an ignition unit or locking unit of the accessible device 10, when it is designed as a vehicle, for example.

Figure 7:
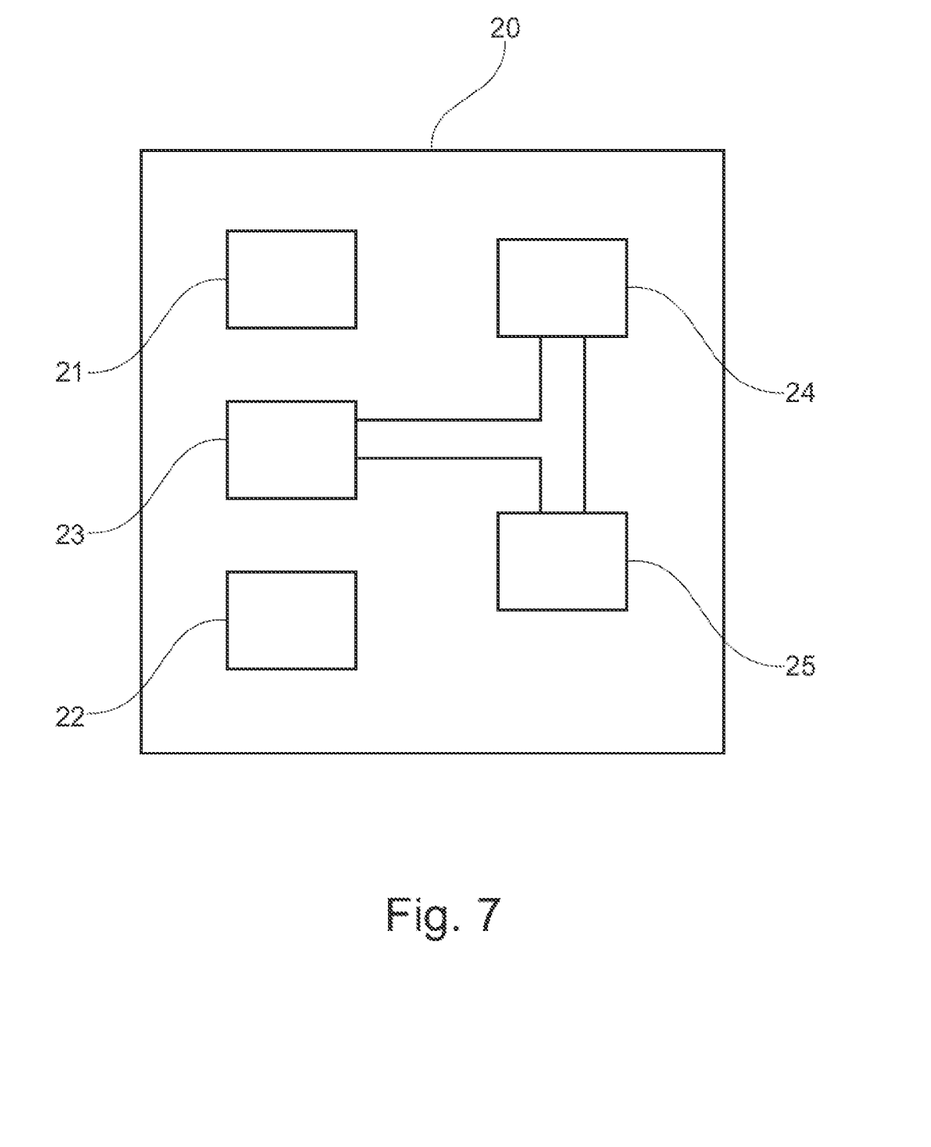
FIG. 7 is a schematic representation of an example of the access device in the keyless system of FIG. 1.

FIG. 7 shows an example of a possible structure of the access device 20 being similar to the one of the accessible device 10 of FIG. 6 but without an accessible unit 16. The access device 20 has two antennas 21, 22 and a controller unit 23 having the same function as in the accessible device 10. The controller unit 23 is connected to a memory unit 24 and a computing unit 25. The memory unit 24 and the computing unit 25 are connected to each other.

In both cases, the accessible device 10 and the access device 20, the computing units 15, 25 may be designed to perform the determinations whether at least one message contained in the received at least one pilot signal corresponds to at least one expected message being expected and/or determining whether at least one derived channel feature corresponds to at least one expected channel feature as previously explained. The computing units 15, 25 may for this purpose execute a computer program product comprising instructions stored in the memory units 14, 24. The memory units 14, 24 may also store the expected at least one message and/or the at least one expected channel feature.

Figure 8:
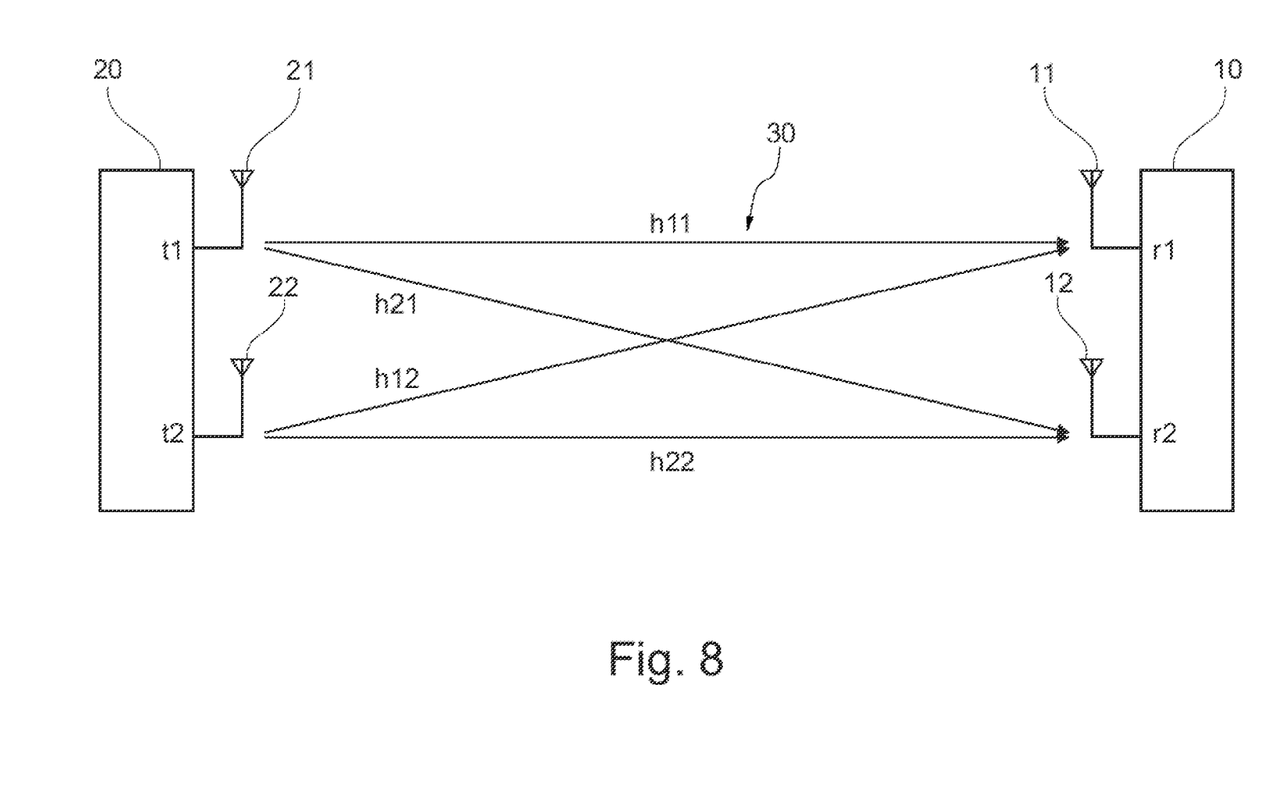
FIG. 8 is a schematic representation of a communication link between the accessible device of FIG. 6 and the access device of FIG. 7 in the keyless system of FIG. 1.

Turning to FIG. 8, a specific example of the steps 210 to 212 of the method 200 is explained. In this case, the antennas 21, 22 of the access device 20 act as transmitters. They send out pilot signals t1, t2 via communication channels h11, h21, h12, h22 of the communication link 30 received as pilot signals r1, r2 by the antennas 11, 12 of the accessible device 10. As previously explained, the situation may additionally or alternatively be the other way around such that the antennas 11, 12 of the accessible device 10 may send out the pilot signals t1, t2 via the communication channels h11, h21, h12, h22 received by the antennas 21, 22 of the access device 20 as received pilot signals r1, r2.

In step 210 of the method 200 explained with reference to FIG. 5, the channel state information is extracted from the received pilot signals r1, r2 received via the communication channels h11, h21, h12, h22 of the communication link 30. This channel state information may be described in the form r1=h11×t1+h12×t2 and r2=h21×t1+h22×t2. The channel matrix H is then established, wherein the receiving vector r may be represented in frequency domain as the product of the channel matrix H and the transmitting vector t:

$$\vec{r} = H \cdot \vec{t},$$

or $$\begin{bmatrix} r1 \\ r2 \end{bmatrix} = \begin{bmatrix} h11 & h12 \\ h21 & h22 \end{bmatrix} \cdot \begin{bmatrix} t1 \\ t2 \end{bmatrix}.$$

Afterwards, in step 211, as channel feature to be derived, the determinant of the channel matrix H is formed. The determinant of the above channel matrix H for a MIMO setup, although other setups may be applied, is determinant=h11·h22−h12·h21.

It has been found that the determinant of such an antenna system, in particular being at least a 2×2 MIMO antenna system, has a determinant with an arbitrary value. This means, that the determinant has an arbitrary value when the accessible device 10 and the access device 20 communicate with each other without any interference by a relay station in course of a relay attack.

Figure 9:
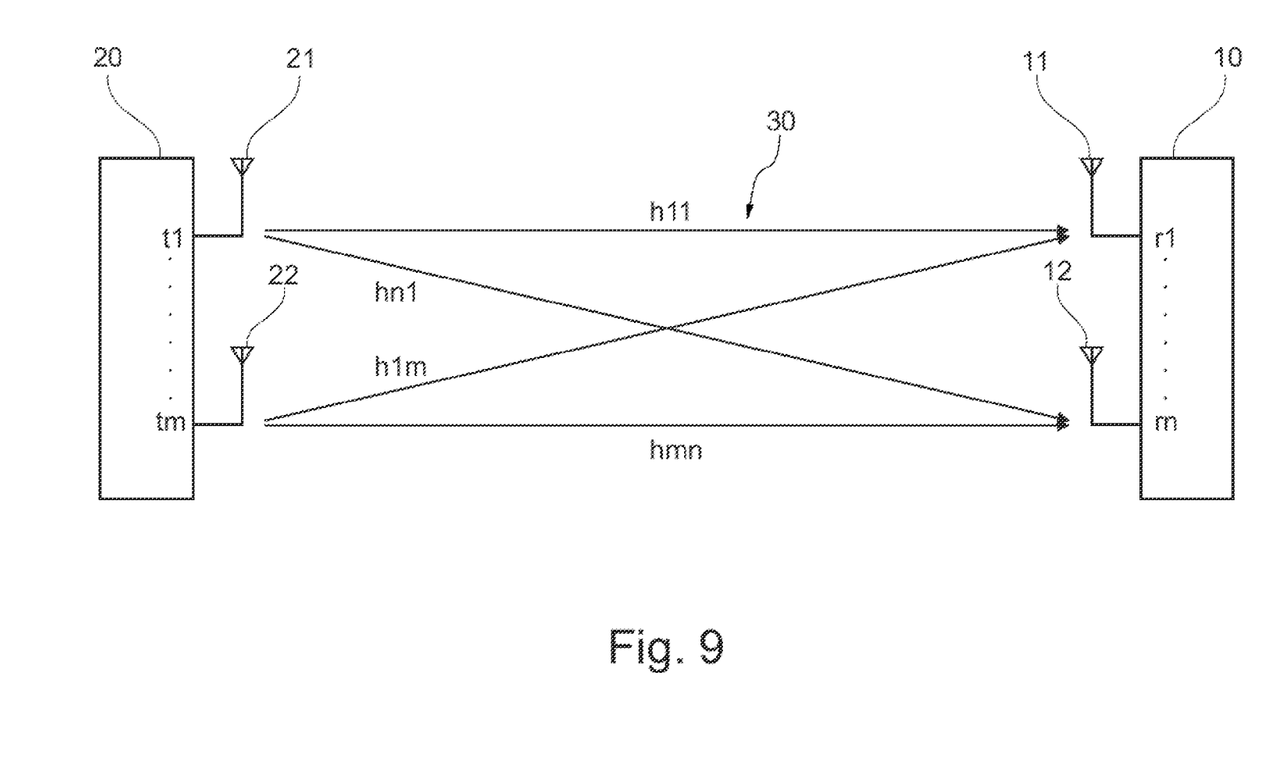
FIG. 9 is a schematic representation of a communication link between the accessible device of FIG. 6 and the access device of FIG. 7 in the keyless system of FIG. 1 having multiple transmitters and receivers.

FIG. 9 essentially shows FIG. 8 in an alternative embodiment of the keyless system of FIG. 1. In FIG. 9, the devices 10, 20 may be provided with several transmitters and receivers as indicated by t1 . . . tm and r1 . . . rn and accordingly the devices 10, 20 may have more than two antennas 11, 12, 21, 22 each.

Figure 10:
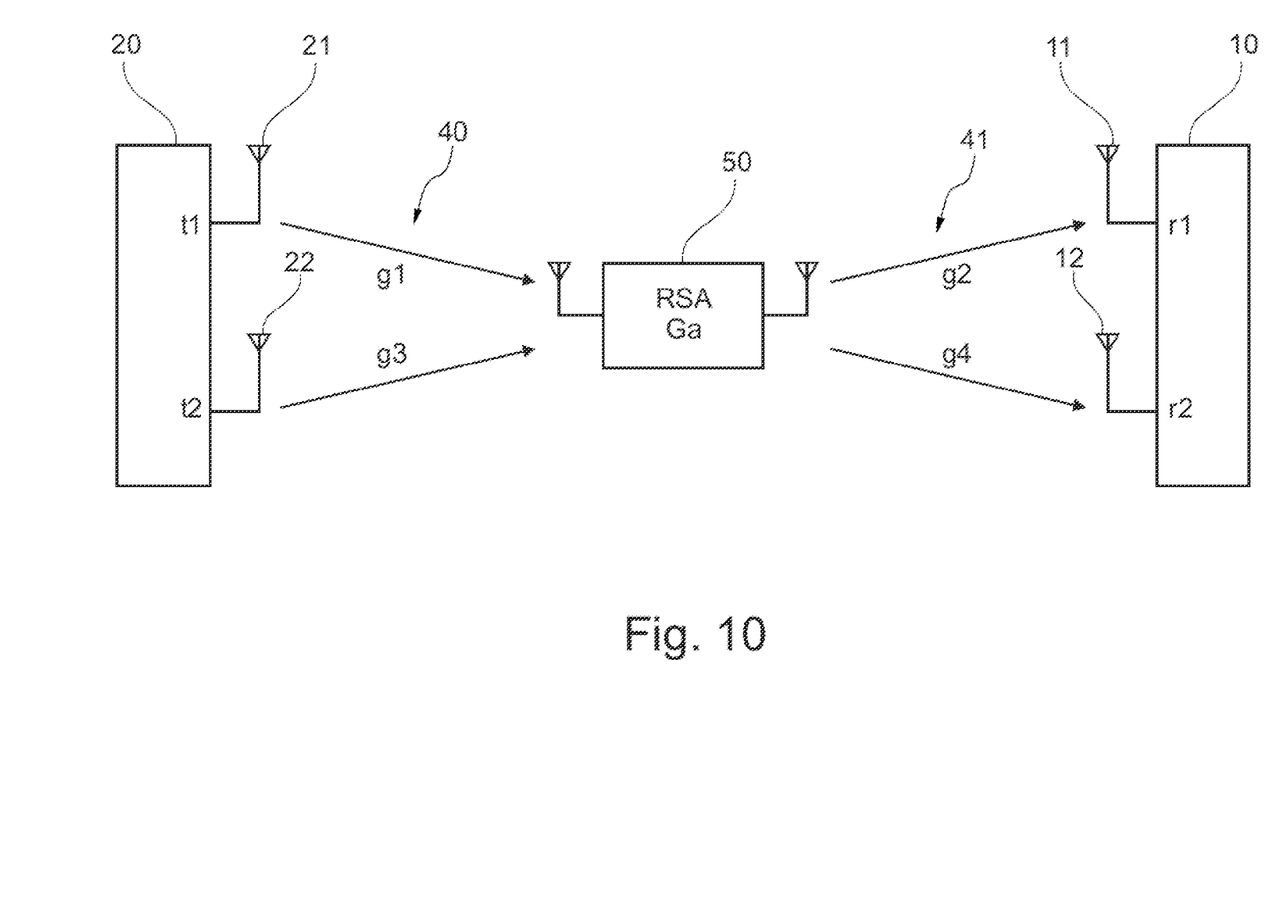
FIG. 10 is a schematic representation of a communication link between the accessible device of FIG. 6 and the access device of FIG. 7 interrupted by a relay attack with one relay station as depicted in FIG. 3.
Figure 11:
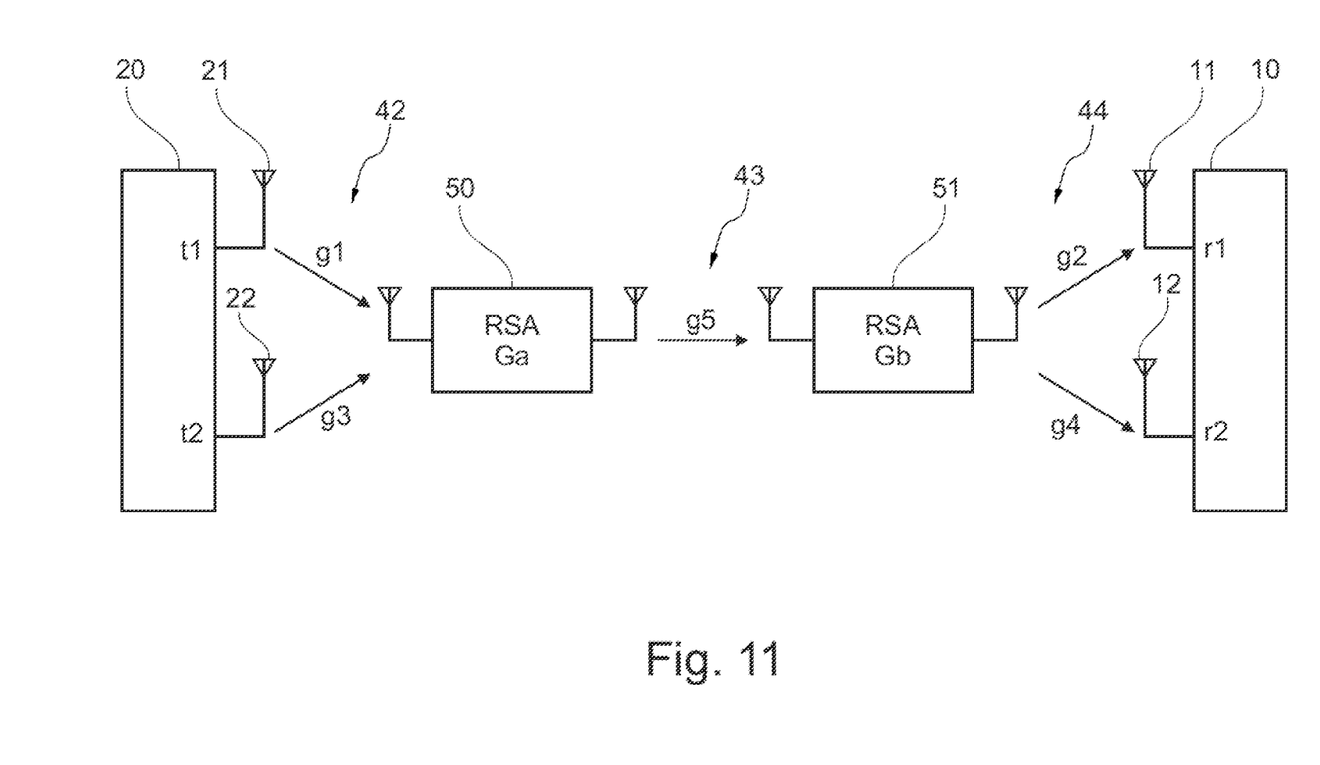
FIG. 11 is a schematic representation of a communication link between the accessible device of FIG. 6 and the access device of FIG. 7 as depicted in FIG. 4.

FIGS. 10 and 11 show cases of the communication link between the respective antennas 11, 12, 21, 22 of the devices 10, 20 having one relay station 50 or two relay stations 50, 51 forwarding the pilot signals t1, t2 via communication channels g1, g3 sent out from the antennas 21, 22 of the access device 20 in the course of an RSA. This corresponds to the schematic representations of FIGS. 3 and 4.

In FIG. 10, the pilot signals t1, t2 are sent via the communication channels g1, g3 of a first communication link 40 to a relay station 50 performing the RSA and forwarding (or relaying) the pilot signals t1, t2 to the accessible device 10 via communication channels g2, g4 of a second communication link 41 established between the relay station 50 and the accessible device 10.

In FIG. 11, the pilot signals t1, t2 are sent via the communication channels g1, g3 of a first communication link 42 to a first relay station 50 performing the RSA and forwarding (or relaying) the pilot signals t1, t2 to a second relay station 51 via communication channel g5 of a second communication link 43 established between the two relay stations 50, 51. Then, the second relay station 51 forwards the pilot signals t1, t2 to the accessible device 10 via the third communication link 44 with the communication channels g2, g4.

When an RSA is performed, gains are applied to the pilot signals. In other words, the pilot signals t1, t2 are being amplified. In the case of two relay stations 50, 51, this happens twice (gains Ga and Gb).

When the method 200 of FIG. 4 is applied to the communication according to FIG. 10 having one relay station 50 between the devices 10, 20 experiencing RSA, in step 210 the channel matrix G is established with the receiving vector r in frequency domain being:

$$\begin{bmatrix} r1 \\ r2 \end{bmatrix} = Ga \cdot \begin{bmatrix} g1 \cdot g2 & g3 \cdot g2 \\ g1 \cdot g4 & g3 \cdot g4 \end{bmatrix} \cdot \begin{bmatrix} t1 \\ t2 \end{bmatrix}.$$

For the communication according to FIG. 11 having two relay stations 50, 51 between the devices 10, 20 experiencing RSA, in step 210 the channel matrix G is established with the receiving vector r in frequency domain being:

$$\begin{bmatrix} r1 \\ r2 \end{bmatrix} = Ga \cdot g5 \cdot Gb \cdot \begin{bmatrix} g1 \cdot g2 & g3 \cdot g2 \\ g1 \cdot g4 & g3 \cdot g4 \end{bmatrix} \cdot \begin{bmatrix} t1 \\ t2 \end{bmatrix}.$$

The channel matrix G is the same for both cases of RSA. The determinant computed in step 211 of that channel matrix G is determinant=g1·g2·g3·g4−g3·g2·g1·g4. Accordingly, the value of the determinant is zero or substantially zero due to noise but not an arbitrary value.

Accordingly, the step 212 in the method 200 is performed based on an expected channel feature of a determinant having an arbitrary value or, in other words, not being zero.

Therefore, when an RSA occurred, the method 200 will be aborted in step 213 and only proceeded with to access the accessible device 10 when the value of the determinant is not substantially zero.

If the devices 10 and 20 are within the predetermined reach of each other based on the communication link 30 without RSA, in addition to the communication links 40, 41, 42, 43, 44 with RSA or established due to the RSA, the communication link 30 without RSA having the communication channels h11, h21, h12, h22 may be established. The pilot signals t1, t2 may than be received by the accessible device 10, if the pilot signals t1, t2 are sufficiently strong. Then, the pilot signals t1, t2 received on the accessible device 10 via the communication link 30 may be superposed with the pilot signals t1, t2 received on the accessible device 10 via the communication links 41, 44 with RSA. The pilot signals t1, t2 received on the accessible device 10 via the communication link 30 may be negligible, if the distance is large or they are blocked by elements in between, e.g., concrete of a parking garage. Anyhow, the pilot signals t1, t2 relayed via the communication links 40, 41, 42, 43, 44 with RSA may be determined due to their channel state information not matching the expected channel state information as described above and therefore the method 200 works independent from whether the communication link 30 without RSA is established or not.

As previously explained, the antenna system is not limited to a 2×2 system as explained or the example of determinant of channel matrix as channel feature. The system may be any n by n or n by m system, wherein n and m are equal to or greater than 1.

Also, generally, the proposed technique may be applied at different frequencies within the same band and/or different frequency bands. Moreover, different wireless technologies such as wireless LAN, Bluetooth, Ultrawideband or others may be used for the communication between the devices 10, 20.

The invention being thus described, it will be obvious that the same may be varied in many ways. Such variations are not to be regarded as departure from the spirit and scope of the invention, and all such modifications as would be obvious to one skilled in the art to be included within the scope of the following claims.

What is claimed is:

1. A method for triggering a first device, the first device comprising at least one antenna for wireless communication with a second device having at least one antenna, the first device being an accessible device or an access device, the second device being the other one of the accessible device and the access device, and the triggering of the first device being a step required for accessing the accessible device, wherein the method comprises:
receiving at least one pilot signal on the first device via the at least one antenna;
determining whether at least one message contained in the received at least one pilot signal corresponds to at least one expected message being expected by the first device;
extracting channel state information from the received at least one pilot signal;
deriving at least one channel feature from the extracted channel state information;
determining whether at least one derived channel feature corresponds to at least one expected channel feature expected by the first device; and
triggering the first device, if the received at least one message corresponds to the at least one expected message and the at least one derived channel feature corresponds to the at least one expected channel feature, or, otherwise, not triggering the first device,
wherein the first device has two or more antennas and the second device has two or more antennas such that the method is performed based on at least four received pilot signals,
wherein the channel state information is extracted as a channel matrix from the at least four received pilot signals, and
wherein the at least one derived channel feature is a determinant computed from the extracted channel matrix.

2. The method according to claim 1, wherein the at least one derived channel feature and/or the at least one expected channel feature is modified by an analytical and/or statistical process.

3. The method according to claim 2, wherein machine learning is applied in the analytical and/or statistical process.

4. The method according to claim 1, wherein the at least one expected channel feature is any value of the determinant.

5. A method for accessing an accessible device, the method comprising the method according to claim 1 and the further steps of:
accessing the accessible device after triggering the first device, if the accessible device is the first device; or
sending at least one further pilot signal to the second device via the at least one antenna of the first device after triggering the first device, if the access device is the first device.

6. The method according to claim 5, wherein the accessible device is a vehicle and the accessing is an unlocking of the vehicle or a passive unlocking of the vehicle, and/or a starting of an ignition of the vehicle.

7. A first device comprising at least one antenna for wireless communication with a second device having at least one antenna, the first device being an access device or an accessible device, wherein the first device is configured to execute the method according to claim 1.

8. A system comprising the first device according to claim 7 and the second device.

9. A non-transitory computer-readable medium having stored thereon a computer program that, when executed by a computer, causes the computer to carry out the method according to claim 1.

10. The method according to claim 1, wherein the accessible device is a vehicle and the access device is a key fob or smart device.

11. The method according to claim 3, wherein the machine learning is deep learning.

12. The method according to claim 4, wherein the value of the determinant is zero.

* * * * *